J. H. SMITH.
AIR BAG FOR VULCANIZERS.
APPLICATION FILED APR. 1, 1918.
1,335,353.
Patented Mar. 30, 1920.
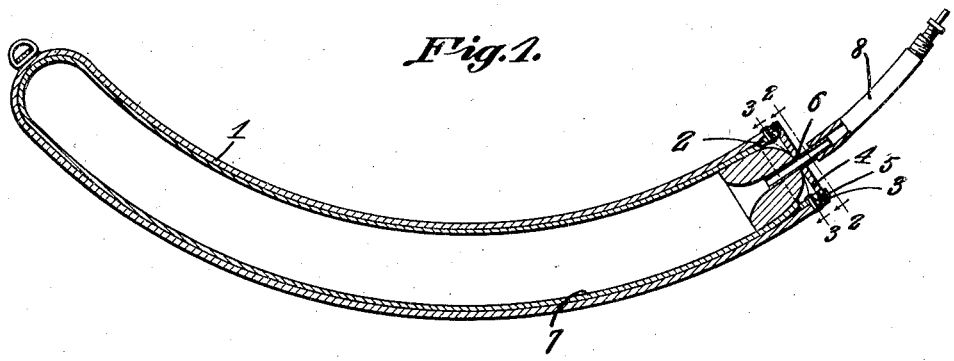
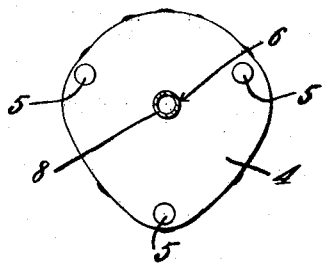 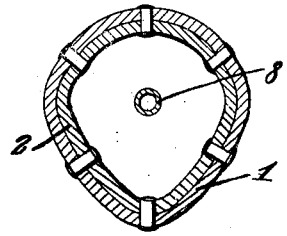
J. H. Smith, Inventor
Witness

UNITED STATES PATENT OFFICE.

JAY HARLEY SMITH, OF SAN FRANCISCO, CALIFORNIA.

AIR-BAG FOR VULCANIZERS.

1,335,353.  Specification of Letters Patent.  Patented Mar. 30, 1920.

Application filed April 1, 1918. Serial No. 226,025.

*To all whom it may concern:*

Be it known that I, JAY HARLEY SMITH, a citizen of the United States, residing at San Francisco, in the county of San Francisco and State of California, have invented a new and useful Air-Bag for Vulcanizers, of which the following is a specification.

This invention relates to air tubes such as used for inflating a tire being repaired so as to cause it to fit snugly in the mold of the vulcanizer. Heretofore it has been the practice to use a single inflatable tube for this purpose but the tube soon becomes leaky and has to be discarded because it cannot readily be repaired.

One of the objects of the present invention is to provide means whereby a discarded air tube or bag can be utilized as a jacket for a new air bag, it being possible readily to insert or remove the inner bag relative to its jacket and to repair the inner bag or tube in the event of leakage, thus materially reducing the cost of operating a tire repairing apparatus.

With the foregoing and other objects in view which will appear as the description proceeds, the invention consists of certain novel details of construction and combinations of parts which will be hereinafter more fully described and pointed out in the claim, it being understood that various changes may be made within the scope of the appended claim without departing from the spirit of the invention.

In the accompanying drawings the preferred form of the invention has been shown.

In said drawings

Figure 1 is a central longitudinal section through the air bag constituting the present invention.

Fig. 2 is a section on line 2—2, Fig. 1.

Fig. 3 is a section on line 3—3, Fig. 1.

Referring to the figures by characters of reference, 1 designates the jacket or casing of the device the same being preferably formed of a discarded air bag one end of which is cut off. Fitted within said end is a ring 2 having an annular flange 3 the periphery of which is substantially flush with the outer surface of the jacket. The flange is fastened to the jacket by rivets or the like. Detachably connected to the flange 3 is a cover plate 4 and openings are formed in the cover plate at intervals for the reception of fastening screws 5 which enter the flange. An opening 6 is formed at the center of the cover plate.

An ordinary air bag 7 is adapted to be used with the jacket 1, said air bag having the usual tube 8 extending therefrom at one end for connection with an air pump.

After the ring 2 has been secured in one end of the jacket 1, the collapsed bag can be inserted through the ring and into the jacket and the tube 8 inserted through the opening 6. The plate 4 is then closed and secured and by inflating the air bag the jacket will be distended and can be used within a tire in the same manner as the ordinary air bag. When the air bag begins to leak, however, it can be repaired in the same manner as the inner tube of a tire and replaced in the jacket. Thus a long continued use of a single air bag is permissible.

It is to be understood that the jacket 1 can be made of any material capable of holding the necessary air pressure. The air bag also can be made of any composition strong and tight enough to hold the air under pressure or it can be made of rubber, as preferred. The inflating tube can, if desired, be dispensed with and a valved stem can be substituted therefor. Likewise various other obvious modifications can be made within the scope of the claim.

What is claimed is:—

An air bag for use in vulcanizing tubes, casings and the like, including a flexible air bag having one of its integral ends intact while its other end is cut off to leave the bag open, a rigid ring within and secured to the open end of said flexible bag, said bag being free of projections on the outer surface thereof, a cover plate detachably secured to and located outside of the ring and air bag, said cover plate having an opening therein, another bag detachably arranged within the first named bag and closed at both ends, and an inflating tube extending from the inner air bag and through the opening in the cover.

In testimony that I claim the foregoing as my own, I have hereto affixed my signature in the presence of two witnesses.

JAY HARLEY SMITH.

Witnesses:
  JOHN H. CRABBE,
  HARRY GOLDSTEIN.